United States Patent Office 3,586,662
Patented June 22, 1971

3,586,662
PREPARING LIGHT-COLORED PROTEIN ISOLATE FROM SUNFLOWER MEAL BY ACID WASHING PRIOR TO ALKALINE EXTRACTION
David E. O'Connor, Cincinnati, Ohio, assignor to The Procter & Gamble Company, Cincinnati, Ohio
No Drawing. Filed Sept. 8, 1969, Ser. No. 856,164
Int. Cl. A23j 1/14; C07g 7/00
U.S. Cl. 260—123.5
9 Claims

ABSTRACT OF THE DISCLOSURE

Light-colored protein is recovered from sunflower meal by acid washing previous to alkali extraction and acid precipitation. The isolated protein is suitable for use as a protein supplement additive for food products without imparting to the food products an unappetizing color.

BACKGROUND OF THE INVENTION

This invention relates to a method for isolating protein from sunflower meal.

When oil is expelled from sunflower seeds, for example, by any convenient method, a resulting by-product is the residue which is denoted sunflower meal. This meal can be a valuable source of protein which can be used for nutritious purposes, for example, for addition to food products such as breakfast cereals, meat products, peanut butter, imitation dairy products, pet foods, and snack foods to supplement the protein therein and/or to provide a protein constituent.

One method of isolating protein from sunflower meal involves alkali extraction of the meal to extract protein therefrom followed by acid precipitation of protein from the extract. In the alkali extraction step, the meal is first admixed with water, the weight ratio of water to meal ordinarily ranging from 10:1 to 25:1. The pH of the water is then adjusted to range from 9 to 11 by the addition of a strong base, for example sodium hydroxide. The meal/basified water mixture is then agitated, for example, from 15 to 90 minutes whereby protein and some non-protein impurities are extracted from the meal to form a liquid extract phase and a solid residue of spent meal. The extract phase which is a solution comprising water, protein and non-protein impurities is then separated from the spent meal, for example, by centrifugation. This extract phase is then treated in an acid precipitation step. In this step, the pH of the extract phase is adjusted to range from 3.5 to 6 by the addition of an acid, for example hydrochloric acid or sulfuric acid. This pH adjustment step, that is, the addition of the acid, precipitates protein as a solid from the liquid extract phase. It is preferable that the pH of the extract phase be adjusted to 4.5 by the addition of the acid since pH 4.5 is the isoelectric point of the protein, that is, the point where the protein is least soluble in water; and therefore, at this point, the most protein is recoverable from the water by an acid precipitation method. The precipitated protein is then recovered from the acid-adjusted extract phase by any convenient physical separation method, for example, by centrifugation. The entire process, that is, the alkali extraction, precipitation and separation operations are ordinarily carried out utilizing ambient temperatures, that is, without the application of external heating or cooling; however, higher or lower temperatures are sometimes utilized. The recovered precipitated protein is denoted protein isolate. The protein isolate ordinarily has an intense green color. This is because the meal starting material has as a constituent green color-forming precursors [1] which in a conventional alkali extraction/acid precipitation process result in the formation of this green color in the protein isolate. Once it appears, the green color cannot be removed from the isolate product by dialysis or other conventional means of purification. If the intensely colored isolate is added to food products as a protein supplement additive, the green color is imparted to the food product so that it is characterized either by a green cast or by a green color. This green cast or green color is ordinarily considered unappetizing. Thus, protein isolated from sunflower meal in this way is not useful as a nutritious supplement for foods except those few foods with which a green color is normally associated, for example, split pea soup. This alkali extraction acid precipitation method of recovering protein from sunflower meal and its disadvantage of providing green color-characterized protein isolate is described in an article by Smith, A. K. and Johnson, V., in Cereal Chemistry 25, 399–406 (1948). This Cereal Chemistry article indicates that green color formation can be temporarily prevented in the protein isolate by the use of reducing agents such as dithionite salts during alkali extraction. The protein recovered after the use of this reducing agent may be light-colored, but the green color appears if this isolated protein is utilized as a supplement in foods with even a slightly basic pH.

SUMMARY OF THE INVENTION

Briefly stated, in this invention an acid washing step is utilized previous to alkali extraction and recovery of protein from the extract to produce a light-colored protein isolate which does not have an intense green color when utilized as a supplement in food products. More particularly, the present invention involves multi-stage washing of sunflower meal with water adjusted to acid pH, then subjecting the acid-washed meal to conventional alkali extraction followed by recovering protein from the extract by acid precipitation or other protein recovery method.

DETAILED DESCRIPTION OF THE INVENTION

The sunflower meal for use in the acid washing step which is a novel feature of this invention can be derived from sunflower seeds by any convenient method. For example, sunflower seeds can be oil expelled or solvent extracted in processes described at pages 663 through 713 of Bailey's Industrial Oil and Fat Products, 3d Edition (1964), John Wiley & Sons, New York. The residue left after the oil recovery is sunflower meal suitable for use in this invention. The meal can be derived from any variety of sunflower seeds. For examples, varieties such as Amaviric, Peredovik, Smena or Mingren are suitable. Preferably, dehulled seeds are utilized.

The sunflower meal is subjected to the multi-stage acid washing operation of this invention by washing the meal from 2 to 7 times previous to its alkali extraction. In this acid washing step the meal is first admixed with water, the weight ratio of water to meal ranging from 3:1 to 20:1, preferably 5:1 to 15:1. Then the pH of the water/meal mixture is adjusted to range from 3.5 to 6.0 by the addition of an acid, for example, monobasic sodium phosphate, hydrochloric acid, sulfuric acid, or phosphoric acid. The pH-adjusted meal/water mixture is then ordinarily subjected to mixing for a convenient

---

[1] The term "green color-forming precursors" is utilized herein to include those components in the meal which when subjected to basic conditions during conventional alkali extraction in the presence of air are essential to the formation of and participate in the formation of green color. Examples of these components are phenolic materials such as chlorogenic acid.

period of time, for example, for 10 to 60 minutes, to extract green color-forming precursors from the meal and provide a solid treated meal phase and a liquid aqueous acid phase into which green color-forming precursors have been extracted. The treated meal phase and acid phase are then separated by any convenient method, for example, by centrifugation. The washing process is repeated on the treated meal phase at least one more time and up to 6 more times. Instead of multi-stage washing, a countercurrent washing operation can be employed which is the equivalent from a chemical engineering standpoint of a multi-stage process.

Preferably, the pH of the water is adjusted to range from 4 to 5, with 4.5 being the optimum since this is the isoelectric point of the protein and the least possible protein is lost in the washing solution by the use of this pH. Preferably, the temperature of the mixture during the washing ranges from ambient or room temperature to about 120° F., and 4 to 6 washing stages are utilized.

If pH's below 3.5 or above 6.0 are utilized during the acid washing step, protein losses from the meal into the wash water are excessive. If pH's above 7 are utilized, the ultimate product will be characterized by a green color. If a weight ratio of water to meal less than 3:1 is utilized, an excessive number of washing steps can be necessary and green color-forming precursors may not be satisfactorily washed out of the meal. The weight ratio upper limit of 20:1 is a practical upper limit. Weight ratios much in excess of this limit can cause handling problems. Temperatures less than ambient can be utilized but the extraction proceeds more slowly; there is no advantage to using the lower temperatures. If temperatures greater than about 140° F. are utilized, the protein can be denatured. At least 2 washing stages are necessary in order to remove sufficient green color precursors so that an acceptable ultimate food product can be achieved. The greater the number of washes used, the lighter will be the color. After 7 washes the color improvement increment is so slight that extra washes are not of economic practicality.

The wash water resulting from this acid washing operation can be discarded.

The acid-washed meal recovered from the last washing stage which is utilized is then subjected to a conventional alkali extraction operation. In brief, the alkali extraction operation comprises admixing the acid-washed meal with water, the weight ratio of water to meal ordinarily ranging from 10:1 to 25:1, and adjusting the pH of the mixture to range from 9 to 11 by the addition of strong base so as to form a solid spent meal phase and a liquid aqueous protein-containing extract phase. The phases are separated. Then protein is recovered from the extract phase. This protein recovery can be effected by subjecting the extract phase to a conventional acid precipitation operation wherein the protein is precipitated as a solid from the liquid protein-containing extract phase. In this acid precipitation operation the liquid protein-containing extract phase has its pH adjusted to range from 3.5 to 6.0 by the addition of an acid. Preferably the pH is adjusted to range from 4 to 5. The optimum pH is 4.5 since this is the isoelectric point and the most protein precipitates from the protein-containing extract phase at this point. The precipitated protein is then isolated from the remaining liquid phase by any convenient physical separation process, for example, by centrifugation. Protein can also be recovered from the liquid aqueous protein-containing extract phase by ultrafiltration as described on pages 9 and 10 of the copending application of mine and John E. Hunter entitled "Preparing Light-Colored Protein Isolate From Sunflower Meal," Ser. No. 856,195 filed concurrently herewith.

The isolated protein can be utilized in its recovered state or it can have its pH adjusted to be more or less neutral, that is, to range from 6.5 to 7.5 by the addition of a base such as sodium hydroxide, potassium hydroxide, or sodium carbonate. Preferably, the isolated protein has its pH adjusted to be more or less neutral. It is further preferred that the isolated protein be dried, for example, by spray drying or freeze drying before it is utilized as a food additive.

The isolated protein is not characterized by the intense green color of the protein isolated from conventional alkali extraction/acid precipitation processes. Rather, it is characterized by a light color, that is, a white, gray, light brown, tan, light green-gray, or very light green color. When it is added as a protein supplement to a food product, the food product has an appetizing appearance and is not characterized by a green cast or by the green color normally associated with protein isolated from sunflower meal by a conventional alkali extraction/acid precipitation process. For example, the protein isolated by the process of this invention can be utilized in breakfast cereals, meat products, peanut butter, imitation dairy products, pet foods, or snack foods and the like, as a protein supplement thereto without changing the appetizing appearance of these food products.

The following example further illustrates the novel process herein and the use of the light-colored protein isolated by this process as an additive to a food product without disturbing the appetizing appearance of the food product. In the acid washing, alkali extraction and acid precipitation operations of the example no external heat source is applied and thus the operations are carried out at more or less room temperature.

EXAMPLE

Sunflower meal is derived from dehulled sunflower seeds by grinding the seeds and extracting with hexane to remove oil. The resulting hexane-washed meal is subsequently freed from solvent by allowing the solvent to evaporate from thin layers of the meal. A 10 gram sample of this sunflower meal is then added to 150 ml. of water in a beaker. The weight ratio of water to meal is 15:1. The pH of the meal/water mixture is then adjusted to 4.5 by the addition of hydrochloric acid. This acid-adjusted mixture is then stirred 3 minutes in a household blender and thereafter an additional 15 minutes with a mechanical stirrer whereby green color precursors are removed from the meal. The solid meal and liquid washing solution are then separated by centrifugation, and the supernatant which contains removed green color-forming precursors is discarded. The meal is washed 5 more times in exactly the same fashion. The resulting meal which has been washed 6 times with pH 4.5 water weighs 5.3 grams when dry. This resulting meal is then subjected to a conventional alkali extraction/acid precipitation process. In this process the resulting meal is first admixed with water, the weight ratio of water to meal being 15:1. To this mixture is added sodium hydroxide to adjust its pH to 10.5, whereby the meal is alkali-extracted to provide a liquid extract phase containing dissolved protein and a solid spent meal phase. These phases are separated by centrifugation. The extract phase then has its pH adjusted to 4.5 by the addition of hydrochloric acid to precipitate as a solid the protein dissolved therein. The precipitated protein is then separated from the pH 4.5-adjusted extract phase by centrifugation. The precipitated protein is then slurried with 25 ml. water, and the pH of this mixture is adjusted to pH 7 by the addition of sodium hydroxide. The sample is then freeze-dried to yield 2.36 grams of protein isolate. This protein isolate has a grayish white color. It does not become intensely green in color in a basic milieu.

This protein isolate is admixed with skim milk at a level of 1.5% by weight of the food product to supplement its protein value. The appearance of the milk is essentially the same as if no protein supplement were added. In other words, the skim milk retains its appetizing appearance. Similar results of appetizing appearance are achieved when the protein isolate is utilized as a nutritious additive for breakfast cereals, snack products, or meat products.

In another case, 10 grams of sunflower meal is treated as above except that it is not exposed to any acid washing previous to alkali extraction and acid precipitation. 2.77 grams of product is produced. This product has an intense green color. When it is added to skim milk, it gives that food product a green cast and makes it appear unappetizing.

In another case, 10 grams of sunflower meal is treated as above except that it is exposed only to a single acid washing stage previous to alkali extraction and acid precipitation. The product has a green color. When it is added to skim milk, it gives the food product an unappetizing appearance.

In another case, sunflower meal is treated by the acid washing, alkali extraction, and acid precipitation process described in the first paragraph of this example except that the protein isolate is not neutralized and dried. This isolate is suitable for incorporation in a breakfast cereal without imparting an unappetizing appearance thereto.

Other acids and bases than those described in the example above can be utilized to adjust the pH to the required level with similar results of light-colored protein isolate and protein-supplemented ultimate food products with appetizing appearance. For example, sulfuric acid or monobasic sodium phosphate can be utilized to adjust the acid pH; and strong bases such potassium hydroxide can be utilized instead of the sodium hydroxide above.

Moreover, protein can be recovered from the extract phase resulting from the alkali extraction operation by ultrafiltration instead of acid precipitation with similar results of light-colored protein isolate and ultimate food products with appetizing appearance.

Other patent applications relating to preparing light-colored protein are (1) the previously mentioned co-pending application of mine and John E. Hunter and (2) my copending application entitled "Preparing Light-Colored Protein Isolate From Sunflower Meal," Ser. No. 856,195 filed concurrently herewith.

What is claimed is:

1. In the process for isolating protein from sunflower meal by alkali extraction of the meal followed by acid precipitation of protein from the extract, the improvement of producing light-colored protein isolate by washing said meal from 2 to 7 times previous to its alkali extraction, each washing comprising the steps of
   (a) admixing water with said meal, the weight ratio of water to meal ranging from 3:1 to 20:1;
   (b) adjusting the pH of the mixture resulting from step (a) to within the range of 3.5 to 6.0 by the addition of an acid and forming a treated meal phase and an acid phase into which green color-forming precursors have been extracted;
   (c) separating the treated meal phase and the acid phase.

2. The process of claim 1 wherein the sunflower meal is derived from dehulled sunflower seeds.

3. The process of claim 2 wherein in step (b) the pH adjusted meal/water mixture is subjected to mixing for from 10 to 60 minutes.

4. The process of claim 3 wherein in step (a) the weight ratio of water to meal ranges from 5:1 to 15:1.

5. The process of claim 4 wherein in step (b) the pH is adjusted to range from 4 to 5.

6. The procses of claim 5 wherein the pH is adjusted to be 4.5.

7. The process of claim 5 wherein in step (c) the separation is carried out by centrifugation.

8. The process of claim 5 wherein in step (b) the pH is adjusted by the addition of hydrochloric acid.

9. A process for isolating light-colored protein from sunflower meal, said process comprising the steps of
   (a) washing said meal from 2 to 7 times, each washing comprising the steps of
      (i) admixing water with said meal, the weight ratio of water to meal ranging from 3:1 to 20:1;
      (ii) adjusting the pH of the mixture resulting from the above step to within the range of 3.5 to 6.0 by the addition of an acid and forming a treated meal phase and an acid phase into which green color-forming precursors have been extracted;
      (iii) separating the treated meal phase and the acid phase;
   (b) alkali extracting said treated meal phase to form a solid spent meal phase and a liquid protein-containing extract phase; and
   (c) recovering light-colored protein from said extract phase.

References Cited

UNITED STATES PATENTS 2,448,185    8/1948    Levin _____ 260—123.5

OTHER REFERENCES

Industrial and Engineering Chemistry, vol. 31, No. 10, pp. 1284–88, 1939, Smith et al.

Cereal Chemistry, 25, 339–406 (1948). Smith et al.

HOWARD E. SCHAIN, Primary Examiner

U.S. Cl. X.R.

99—17